E. B. GEORGIA.
Improvement in Fruit and Vegetable Crates.
No. 129,332.
Patented July 16, 1872.
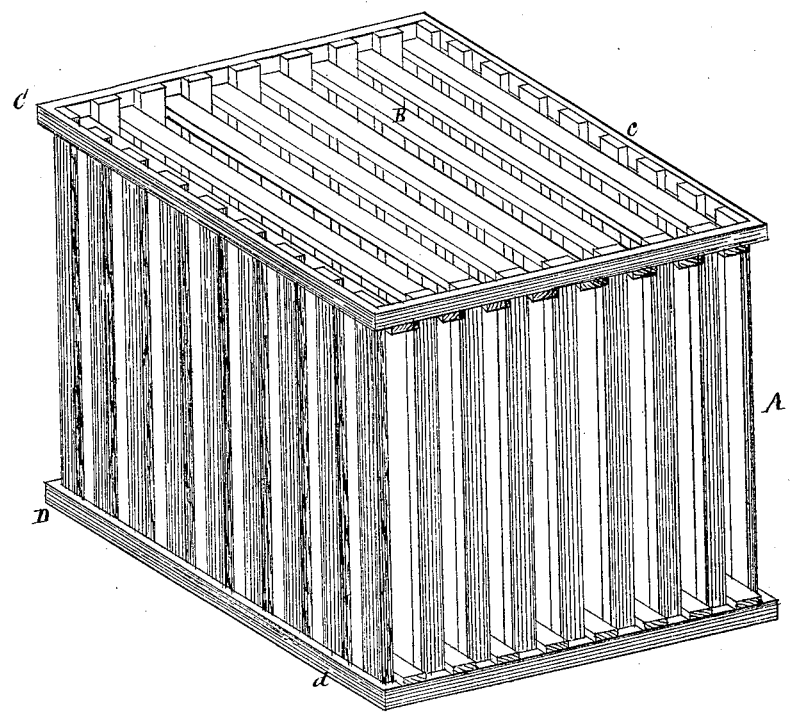
Witnesses:
Inventor:

UNITED STATES PATENT OFFICE.

ELIJAH B. GEORGIA, OF CLIFTON STATION, VIRGINIA.

IMPROVEMENT IN FRUIT AND VEGETABLE CRATES.

Specification forming part of Letters Patent No. 129,332, dated July 16, 1872.

Specification describing an Improved Fruit and Vegetable Crate, invented by ELIJAH B. GEORGIA, of Clifton Station, in the county of Fairfax and State of Virginia.

In packing fruit together without any intermediate substance, either in barrels or boxes, the circulation of air therethrough is, to a great extent, prevented, and the gases that exude from the fruit and vegetables deprived of a ready avenue of escape. This creates a rapid rotting or disintegration, and destroys the natural flavor; hence, crates formed of narrow strips of wood have been much used, and are found to obviate the objections named; but in practice they are also found to be open to another and different but very serious objection. In the rough handling, and by the frequent turning over of these crates, those parts of the fruit that protrude between the slats become bruised and injured. My object has been to relieve crates of this objection, and I think that I have completely succeeded by the peculiar construction of my improved crate, as hereinafter described.

In the drawing the Figure is a perspective view.

A, in the drawing, represents the vertical slats; B, the horizontal slats; and C D, the top and bottom frames.

I first make the frames C D and nail thereon the slats B, leaving an open space between the slats B and the parallel slats c d of the frames. I then place these frames C D with the slats B, arranged inwardly and opposite to each other, and on the inner sides of the slats c d I nail the vertical slats A. By this construction the fruit is entirely protected, and can be moved and turned without any liability to become bruised.

Having thus described my invention, what I claim as new, and desire to secure by Letters Patent, is—

A fruit and vegetable crate, consisting of frames C D, slatted on the inner sides, and connected together by vertical slats A nailed to their inner sides, as described.

To the above specification of my invention, I have signed my hand this 18th day of June, A. D. 1872.

E. B. GEORGIA.

Witnesses:
SOLON C. KEMON,
THOS. D. D. OURAND.